United States Patent [19]
Kim

[11] Patent Number: 5,521,537
[45] Date of Patent: May 28, 1996

[54] BUS INTERFACE LOGIC INTEGRATED CIRCUIT

[75] Inventor: Kyoung H. Kim, Seoul, Rep. of Korea

[73] Assignee: Hyundai Electronics Industries Co., Ltd., Kyoungki-Do, Rep. of Korea

[21] Appl. No.: 363,645

[22] Filed: Dec. 22, 1994

[30] Foreign Application Priority Data

Dec. 23, 1993 [KR] Rep. of Korea ............ 93-29293

[51] Int. Cl.⁶ ............................................. H03K 19/0175
[52] U.S. Cl. ................... 326/86; 326/90; 326/93; 395/309
[58] Field of Search ................ 326/86, 90, 93; 395/309

[56] References Cited

U.S. PATENT DOCUMENTS

| | | | |
|---|---|---|---|
| 4,471,243 | 9/1984 | Isham | 326/86 |
| 4,703,193 | 10/1987 | Porter | 326/86 |
| 4,969,121 | 11/1990 | Chan et al. | 326/86 |
| 4,987,319 | 1/1991 | Kawana | 326/86 |
| 5,115,149 | 5/1992 | Hashmoto | 326/86 |
| 5,179,586 | 1/1993 | Lee | 326/86 |
| 5,218,684 | 6/1993 | Hayes et al. | 395/400 |

*Primary Examiner*—Edward P. Westin
*Assistant Examiner*—Andrew Sanders
*Attorney, Agent, or Firm*—Merchant, Gould, Smith, Edell, Welter & Schmidt

[57] ABSTRACT

A bus interface logic integrated circuit having a function of bus interfacing a system bus with a higher-order module, including a programmable chip connected between the system bus and the higher-order module and adapted to bus interface the system bus and the higher-order module with each other, the programmable chip initiating transmission and receipt of data under a control of the higher-order module. The programmable chip includes input/output units for selecting data input and output between the system bus and the higher-order module, a part of the input/output units being connected to the system bus and the other input/output unit part being connected to the higher-order module, and a combination logic unit for combining parameters generated for the transmission and receipt of data between each of the system bus-side input/output units and each corresponding one of the higher-order module-side input/output units and outputting a value required for the transmission and receipt of data on the basis of the result of the combination.

2 Claims, 2 Drawing Sheets

BUS INTERFACE LOGIC INTEGRATED CIRCUIT

BACKGROUND OF THE INVENTION

1. Field of the Invention

The present invention relates to bus interface logic relating to data transmission and receipt, and more particularly to a bus interface logic integrated circuit for integrating the bus interface logic using a single programmed chip.

2. Description of the Prior Art

Most of conventional data transmitting and receiving systems have a difficulty achieving a compact design because they are realized using transistor-transistor logic. For example, U.S. Pat. No. 5,218,684 discloses a memory configuration system employing a plurality of chips. Since this system employs 30 to 40 chips, a difference in characteristic among the chips is large. As a result, the system is totally subjected to an adverse affect. Since the chips are simultaneously activated, the system also has problems of noise and distortion phenomenon due to an increased signal transfer length.

SUMMARY OF THE INVENTION

Therefore, the present invention has been made in view of the above-mentioned problems and an object of the invention is to provide a bus interface logic integrated circuit including a single programmed chip having an interfacing function, capable of preventing a poor interfacing operation and removing a noise phenomenon, thereby enhancing a stability of the system.

In accordance with the present invention, this object can be accomplished by providing a bus interface logic integrated circuit having a function of bus interfacing a system bus with a higher-order module, comprising: a programmable chip connected between the system bus and the higher-order module and adapted to bus interface the system bus and the higher-order module with each other, the programmable chip initiating transmission and receipt of data under a control of the higher-order module.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
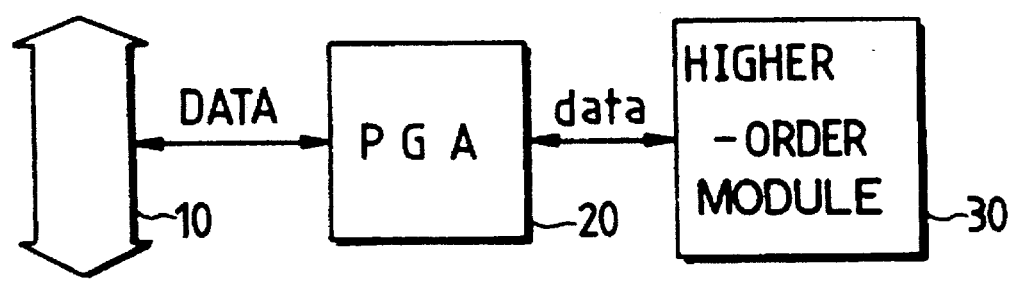
FIG. 1 is a block diagram of a system employing a bus interface logic integrated circuit in accordance with the present invention.

Referring to FIG. 1, there is illustrated a bus interface logic integrated circuit in accordance with the present invention. As shown in FIG. 1, the integrated circuit includes a programmable chip 20 which is connected between a system bus 10 and a higher-order module 30. Through the programmable chip 20, data transmission and receipt are carried out. For the convenience of the description, data outputted from the system bus 10 is denoted by "DATA" whereas data outputted from the higher-order module 30 is denoted by "data". The higher-order module 30 may be a microprocessor of a computer or a cache controller.

Figure 2:
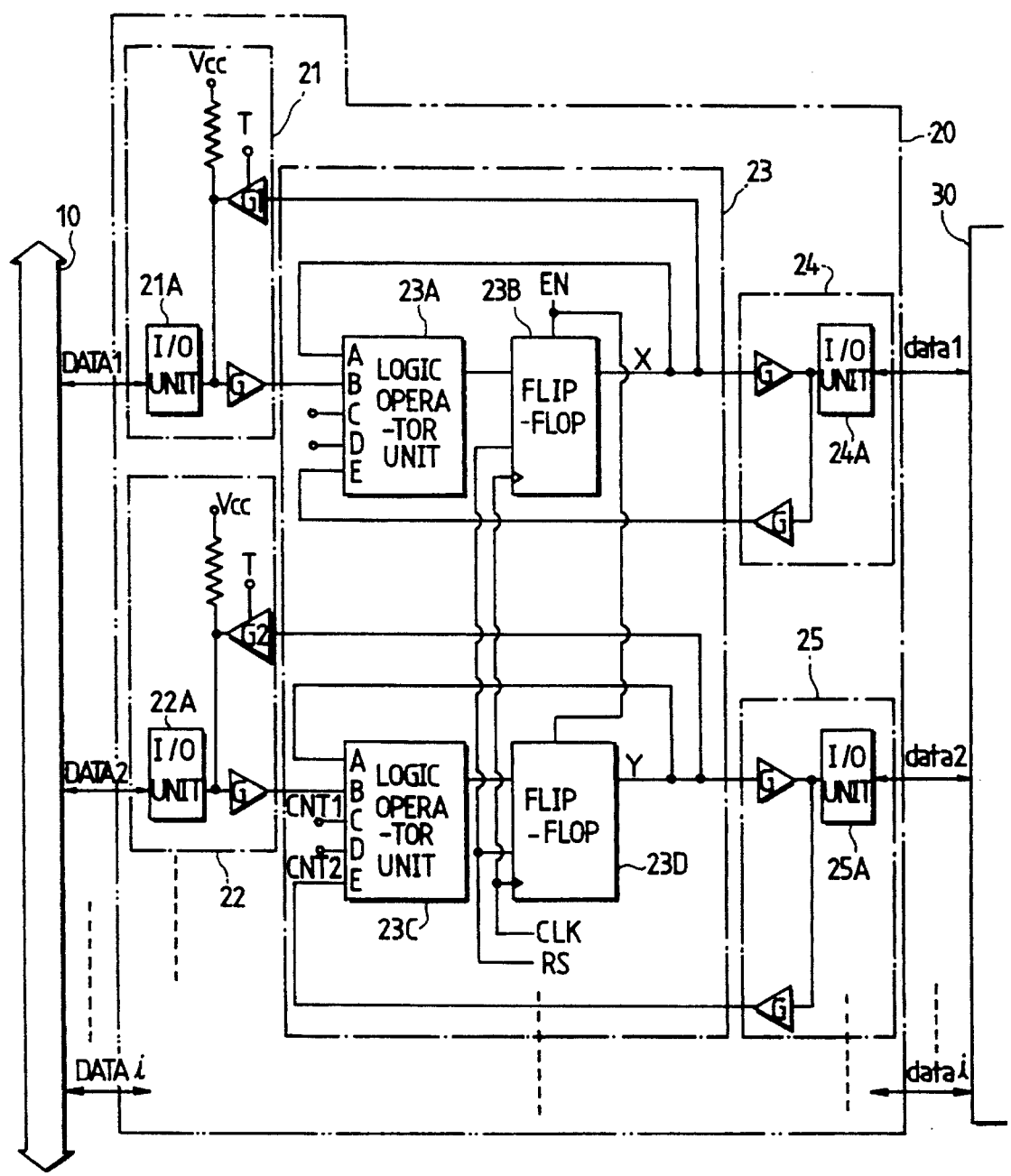
FIG. 2 is a block diagram of the bus interface logic integrated circuit shown in FIG. 1.

As shown in FIG. 2, the programmable chip 20 constituting the bus interface logic integrated circuit includes input/output units 21, 22, 24 and 25 each adapted to select data input and data output between the system bus 10 and the higher-order module 30. The input/output units 21 and 22 are provided on the system bus 10 side whereas the input/output units 24 and 25 are provided on the higher-order module 30 side. The programmable chip 20 also includes a combination logic unit 23 adapted to logically combine parameters inputted for data transmission and receipt and thereby output a desired value.

Elements G of the input/output units 21, 22, 24 and 25 are logic stabling buffers whereas elements G1 and G2 of the input/output units are tri-state gates. The combination logic unit 23 receives a clock signal CLK synchronizing it with the higher-order module 30, a reset signal RS controlled by the higher-order module 30, and a clock enable signal EN.

The combination logic unit 23 includes a pair of logic operation units 23A and 23C each adapted to combine parameters received at its input terminals and a pair of flip-flops 23B and 23D each adapted to communicate with a corresponding one of the logic operation units 23A and 23C synchronously with the clock signal CLK and thereby output data.

A control signal CNT1 is applied to the logic operation unit 23A and 23C when the higher-order module 30 is to receive data. A control signal CNT2 is also applied to the logic operation unit 23A and 23C when the higher-order module 30 is to transmit data.

Operation of the bus interface logic integrated circuit having the above-mentioned arrangement in accordance with the present invention will now be described.

The programmable chip 20 employs a programmable gate array (PGA) package to achieve an interface function in accordance with the present invention. The PGA package may be a field PGA (FPGA) available from XILINX company. The following description will be made in conjunction with an interface function based on the design syntax of the FPGA of XILINX company.

First, a description will be made in conjunction with a case where the programmable chip 20 is to receive data DATA1 from the system bus 10 and then transmit data data1. Once the programmable chip 20 receives the data DATA1 from the system bus 10, the data DATA1 is transmitted to the combination logic unit 23 via an input/output pad 21A of the input/output unit 21.

Where the input data DATA1 is connected to the terminal B of the logic operation unit 23A of the combination logic unit 23, the logic operation unit 23A establishes an initial state for outputting data therefrom when the control signal CNT1 generated upon receiving data from the system bus 10 is active while the flip-flop 23B connected to the terminal A of the logic operation unit 23A generates an output X of low level.

Since the output X from the flip-flop 23B connected to the terminal A of the logic operation unit 23A is at its low level state initially before receiving the data DATA1 from the system bus 10, the logic operation unit 23A outputs a signal having the level of "1" to the flip-flop 23B.

Upon receiving the output signal of 1-level from the logic operation 23A, the flip-flop 23B generates the output X having the level of "1" synchronously with the clock signal CLK. This output X of 1-level from the flip-flop 23B is applied to the higher module 30 via an input/output pad 24A of the input/output unit 24. The output X of 1-level is also fed back to the terminal A of the logic operation unit 23A.

As a result, the logic operation unit 23A outputs a signal of low level to the flip-flop 23B when a next clock CLK is applied to the flip-flop 23B. Accordingly, the output X of the flip-flop 23B is kept active for one clock interval of the clock CLK.

This can be expressed by the following equation (1):

$$X = DATA1 * CNT1 * \sim X \quad (1)$$

where, "*" represents a logic AND and "~X" represents the output X transmitted for one clock interval.

Now, the case where the programmable chip 20 is to receive data data1 from the higher-order module 30 and then transmit data DATA1 to the system bus 10 will be described. Once the programmable chip 20 receives the data data1 from the higher-order module 30, the data data1 is transmitted to the combination logic unit 23 via the input/output pad 24A of the input/output unit 24.

Where the input data data1 is connected to the terminal E of the logic operation unit 23A of the combination logic unit 23, the logic operation unit 23A connected to the flip-flop 23B generates an output signal of 1-level in so far as the control signal CNT2 generated upon transmitting data from the higher-order module 30 to the system bus 10 is active while the flip-flop 23B connected to the terminal A of the logic operation unit 23A generates an output X of low level.

Since the output X from the flip-flop 23B connected to the terminal A of the logic operation unit 23A is at its low level state initially before receiving the data data1 from the higher-order module 30, the logic operation unit 23A outputs a signal having the level of "1" to the flip-flop 23B.

Upon receiving the output signal of 1-level from the logic operation 23A, the flip-flop 23B generates the output X having the level of "1" synchronously with the clock signal CLK. This output X of 1-level from the flip-flop 23B is applied to the system module 10 via the input/output pad 21A of the input/output unit 21. The output X of 1-level is also fed back to the terminal A of the logic operation unit 23A.

As a result, the logic operation unit 23A outputs a signal of low level to the flip-flop 23B when a next clock CLK is applied to the flip-flop 23B. Accordingly, the output X of the flip-flop 23B is active and inactive alternatingly at intervals of the clock CLK.

This can be expressed by the following equation (2):

$$X = data1 * CNT2 * \sim X \quad (2)$$

In this case, the control signal CNT2 is also applied to a tri-state control terminal T of the tri-state gate G1 of the input/output unit 21.

Consequently, the signal X outputted from the flip-flop 23B can be expressed by the following equation (3) derived from a combination of the equations (1) and (2):

$$X = (DATA1 * CNT1 + data1 * CNT2) * \sim X \quad (3)$$

where, "+" represents a logic OR.

Where the programmable chip 20 receives data DATA2 from the system bus 10, the flip-flop 23D outputs a signal Y. The output Y from the flip-flop 23D can be expressed by the following equation (4), as in the above-mentioned cases:

$$Y = DATA2 * CNT1 * \sim Y \quad (4)$$

On the other hand, an output signal Y generated from the flip-flop 23D when the programmable chip 20 receives data data2 from the higher-order module 30 can be expressed by the following equation (5):

$$Y = data2 * CNT2 * \sim Y \quad (5)$$

Consequently, the signal Y outputted from the flip-flop 23D can be expressed by the following equation (6) derived from a combination of the equations (4) and (5):

$$Y = (DATA2 * CNT1 + data2 * CNT2) * \sim Y \quad (6)$$

where, ~Y represents an output transmitted for one clock interval.

Although the programmable chip 20 has been described as achieving the interface function by use of the FPGA of XILINX company (Model No. XC3090), one of EPM7256 series available from ALTERA company may be used.

As apparent from the above description, the present invention provides a bus interface logic integrated circuit including a programmable chip adapted to achieve a bus interface logic between a data bus and a higher-order module, capable of preventing a poor interfacing operation and removing a noise phenomenon, thereby achieving a stability of the system. Accordingly, it is possible to improve the performance and the reliability of the final product.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated bus interface logic circuit interfacing a system bus with a higher-order module, comprising:

a programmable chip connected between the system bus and the higher-order module to interface the system bus with the higher-order module, the programmable chip initiating transmission and receipt of data under control of the higher-order module, the programmable chip including, a plurality of input/output (I/O) units connected to select data input and output between the system bus and the higher-order module, the plurality of I/O units being divided into one or more system bus-side I/O units and one or more higher-order module-side I/O units, the system bus-side I/O units being connected to the system bus and the higher-order module-side I/O units being connected to the higher-order module, and combination logic for combining parameters generated for transmission and receipt of data between a system bus-side I/O unit and a corresponding higher-order module-side I/O unit and for outputting a value required for the transmission and receipt of data based on a result of the combined parameters.

2. An integrated bus interface logic circuit in accordance with claim 1, wherein the combination logic means comprises:

a plurality of logic operation units each adapted to combine the parameters received at input terminals thereof and an output required for the transmission and receipt of data on the basis of the result of the combination; and a plurality of flip-flops each adapted to receive an output from a corresponding one of the logic operation units synchronously with a clock signal and to output data received from the corresponding logic operation unit.

* * * * *